Nov. 8, 1960   L. E. NEFF ET AL   2,958,975
POLE HOLDER WITH POWERED LINE CASTING MEANS
Filed Aug. 6, 1958   3 Sheets-Sheet 3
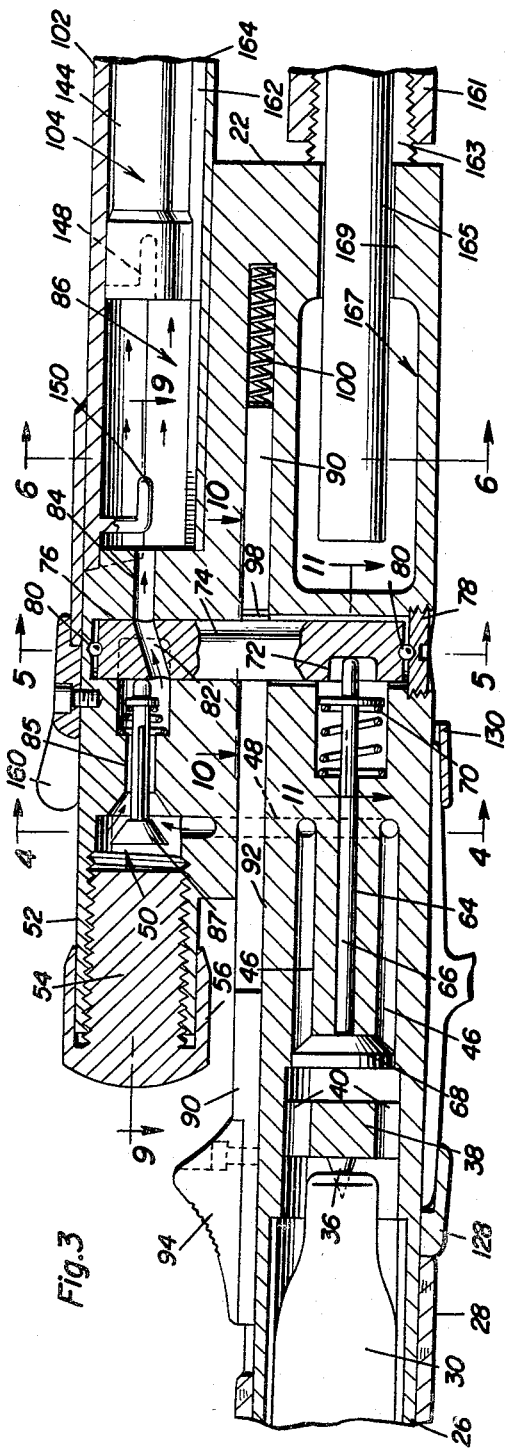
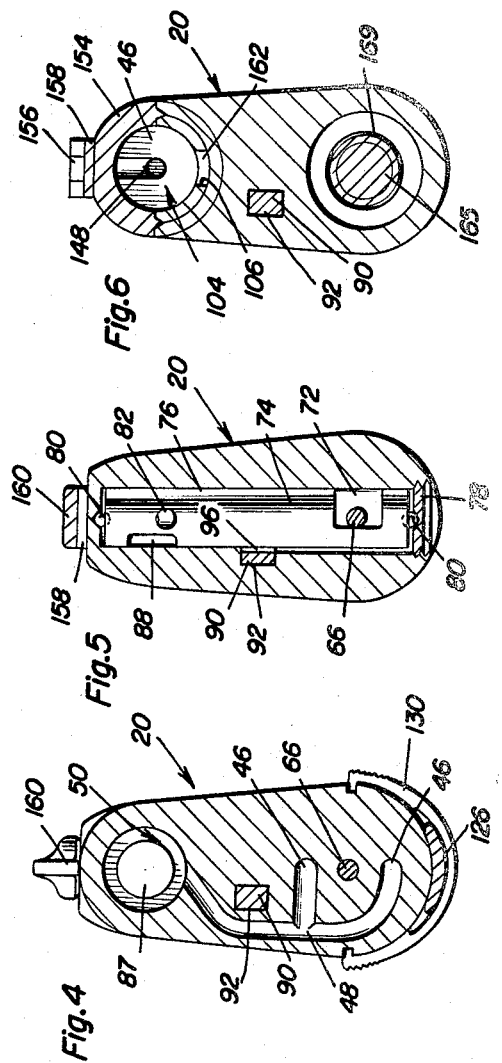
Lester E. Neff
Nida O. Neff
INVENTORS

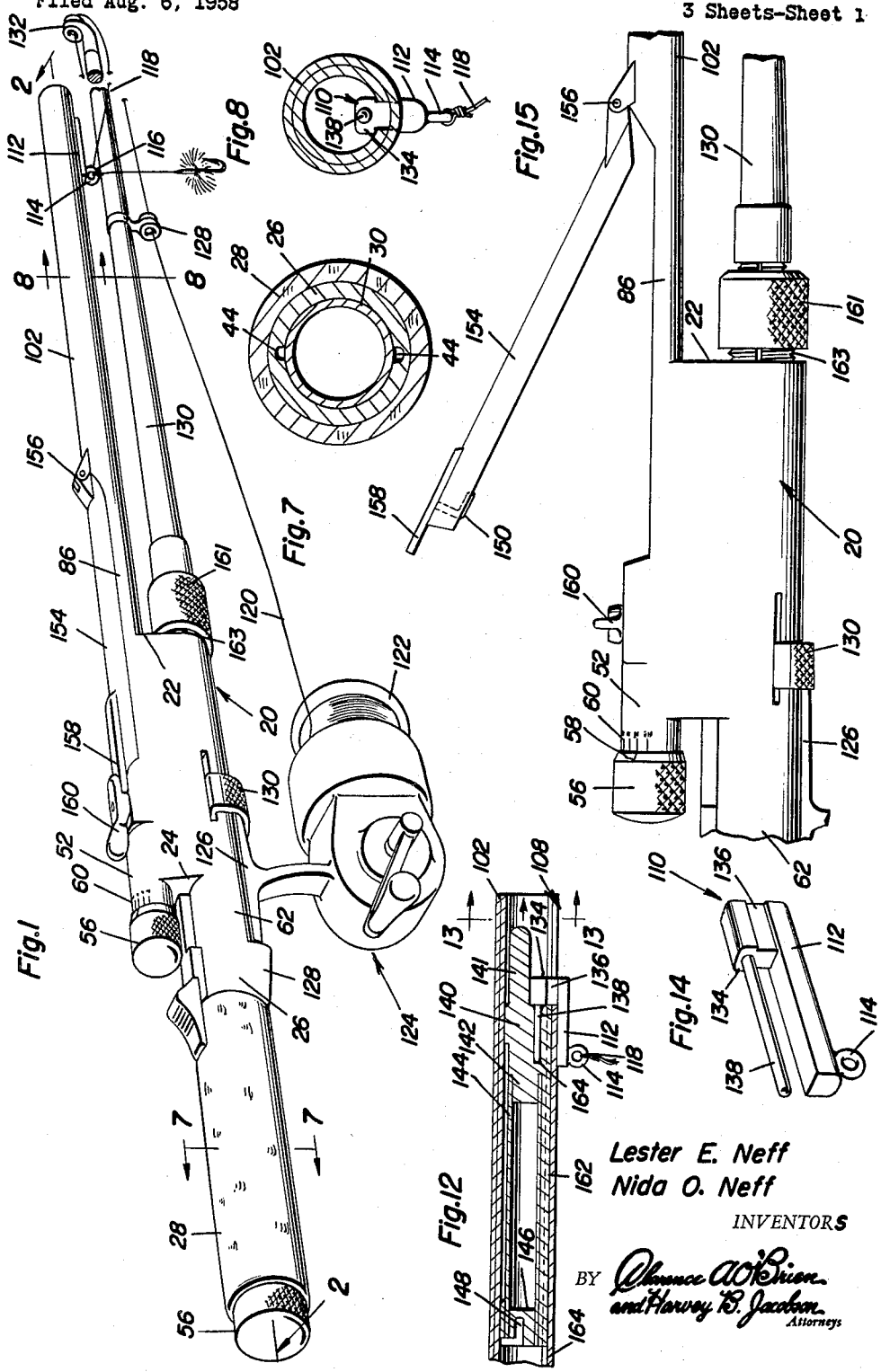

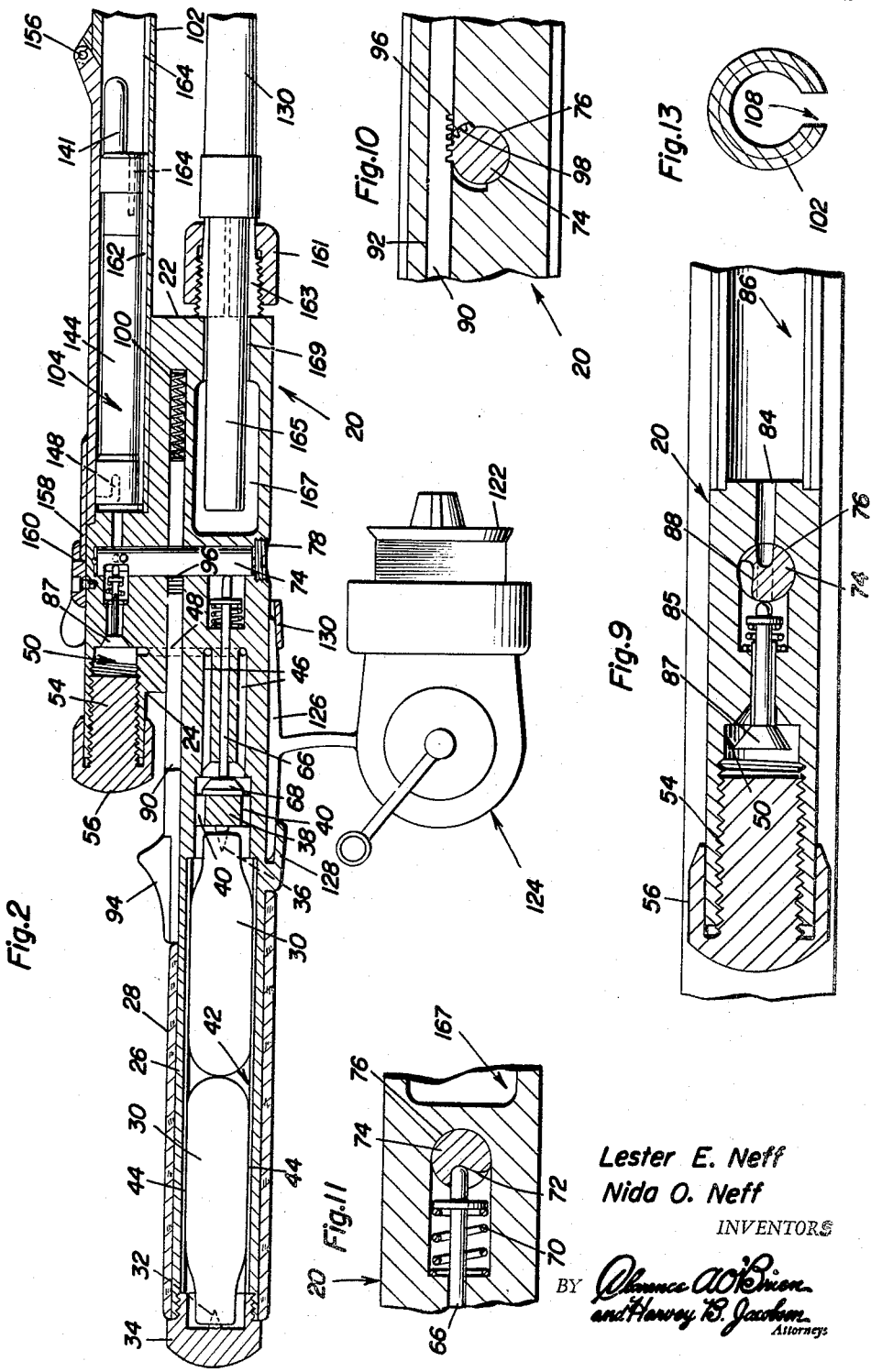

United States Patent Office 2,958,975
Patented Nov. 8, 1960

2,958,975
POLE HOLDER WITH POWERED LINE CASTING MEANS

Lester E. Neff and Nida O. Neff, both of 12341 Louise St., Garden Grove, Calif.

Filed Aug. 6, 1958, Ser. No. 753,579

6 Claims. (Cl. 43—19)

This invention relates to a novel fishing pole holder equipped with automatically operable power means which functions in a manner to forcibly eject a projectile which, in turn, picks up and shoots a sinker and baited fishing line out to a predetermined fishing spot which constitutes the "target" aimed at.

Prior inventors captivated by accurate and long distance casts have long since recognized the fact that, time and again, a fisherman may desire to spot cast a baited line without running the risk of losing the bait and, at the same time, landing the baited hook in an area which, because of low hanging of surrounding trees and difficult-to-penetrate foilage and obstructions renders the area under contemplation virtually inaccessible. With a view toward meeting and coping with the problems, which are still not adequately solved, many and varied types and forms of gun-like and catapulting fishing devices have been devised and, evidently, experimented with. Since, so far as is known, such prior adaptations appear not to have met with widespread adoption and use it is an object in the instant matter to offer a different solution of the problem.

Looking toward an acceptable and practical device which should meet with endorsement and approval a novel baited line shooting gun has been appropriated. Not only does the gun incorporate a suitably triggered projectile powering charge, or equivalent means, it is so constructed that it supports a readily attachable and detachable fishing pole or rod and, in addition, a bracket carrying a spin-type reel.

Stated more explicitly, yet briefly, the invention is characterized by a gun having a stock provided at the proximal or inner end with a hollow handle. The handle provides a receiver and reservoir for pressurized gas releasing cartridges. At the same end there is a valved firing chamber for the accumulated ready-to-function gas, said chamber communicatively joined with the reservoir. There is a forwardly extending barrel on the leading or distal end of the stock, said barrel having a suitably lidded breech chamber for a readily insertable projectile or missle of novel construction. The muzzle end of the barrel is constructed to accommodate a specially constructed lead or an equivalent sinker to which the baited fishing line is attached, said sinker being linked or coupled to the pressurized gas-propelled projectile and travelling with said projectile to the intended fishing spot.

A normally closed check valve controls a gas conducting passage between the firing chamber and the breech chamber at the inner end of the barrel. This valve is tripped to open position by a revolvable trip pin. The trip pin is revolved by a spring returned manually actuatable trigger. In addition the trip pin cooperates with a spring closed pressure opened cut-off valve for the gas reservoir in the handle.

Various aspects and adaptations of the invention touched upon briefly above will be hereinafter set forth in detail and more particularly pointed out in the invention as claimed.

In the drawings:

Fig. 1 is a perspective view of a fishing device or gun constructed in accordance with the principles of the invention and showing the various improvements involved.

Fig. 2 is a fragmentary view on an enlarged scale with parts in section and elevation showing the gun set and ready to be fired and to, in this manner, forcibly eject and propel the projectile.

Fig. 3 is a view based on Fig. 2 and with parts further enlarged and appearing in section and elevation and showing their construction and relationship after the firing chamber has been emptied and the projectile has been sent on its way to the fishing spot aimed for.

Figs. 4, 5 and 6 are transverse or vertical sections on the lines 4—4, 5—5 and 6—6, respectively, of Fig. 3, looking in the direction of the indicating arrows.

Figs. 7 and 8 are sections on the lines 7—7 and 8—8 respectively of Fig. 1.

Figs. 9, 10 and 11 are sections taken on the lines 9—9, 10—10 and 11—11, respectively, of Fig. 3.

Fig. 12 is a view detailing the muzzle or discharge end of the barrel and illustrating, in section and elevation, the outgoing missile picking up the ready-to-function sinker which, in turn, carries the line out.

Fig. 13 is a section on the line 13—13 of Fig. 12.

Fig. 14 is a perspective view of the especially designed and constructed sinker.

Fig. 15 is an enlarged side elevation showing the stock and breech with the breech cover or lid swung to open ready-to-load position.

Since many of the prominent components and parts appear in Fig. 1 initial attention may be given thereto. The aforementioned stock or body, of suitable length and material is denoted by the numeral 20. As seen in Figs. 4, 5 and 6, the major portion of the stock may be said to be generally ovate in cross-section. The forward or distal end is denoted at 22 and the inward or proximal end at 24. The aforementioned hollow handle 26 is formed on and projects beyond the end 24 and is equipped with an appropriate cork or equivalent sleeve or hand-grip 28. As seen in Fig. 2 the space in the hollow handle constitutes a receiver or reservoir. Two compressed gas cartridges 30 are positioned end-to-end in the reservoir and the one to the left is adapted to be punctured by a penetrating prong 32 on the removable screw cap 34 while the one at the right is adapted to be punctured by a similar pointed prong 36 carried by a spider or divider 38. The orifices 40 in the divider allow the gas to escape from the reservoir space 42, the gas travelling along diametrically opposite channels 44 through the orifices 40 and by way of conduits 46 which communicate with a by-pass 48 the upper end of which leads and empties into a pocket 50 which is here referred to as a gas charge accumulating and "firing" chamber. The chamber 50 is at the right hand end of (Figs. 2 and 3) a threaded extension neck 52 into which a plug 54 is screwed. The plug is carried by a suitably knurled finger-gripping cap 56 provided with an index or indicator 58 registering with the graduations 60 on the neck 52 as shown in Figs. 1 and 15 in particular. The size of the chamber can be regulated and consequently the intensity of the potential power shot can be regulated. Before further discussing the firing chamber and the manner in which it receives the pressurized gas from the reservoir chamber or space, attention is again directed to Fig. 3 in particular wherein it will be observed that the extension 62 of the stock is constructed with a bore 64 to accommodate the reciprocating stem 66 of a mushroom type cut-off valve 68. This valve is engageable with a seat at the entrance end of the aforementioned bores or conduits 46. There is a return and seating spring 70 at right angles to a recess or pocket 72 in one side of a free rotating or revolvable multipurpose trip pin 74. The trip pin fits into a transverse socket 76 provided therefor and is held in place by a screw cap 78 and is provided at opposite ends with anti-friction balls 80. The upper end portion of the revolvable pin is provided with a diagonal valving port 82 which registers at one end with a passage 84 which opens at its right (Fig. 3) into that part of the stock which defines a breech or projectile pocket 86. At the left the valving port 82 is alternately communicable with a passage 85 which communicates at its left with the aforementioned firing chamber 50 and together with the complemental passage portion 84 affords communication between the firing chamber and the breech pocket 86. In other words, the firing chamber 50 is at the left and the breech pocket at the right and between them there is a passageway made up of the components 84 and 85 which passageway is controlled by the registerable and non-registerable port 82 in the valving trip pin 74. The portion 85 is however controlled by a suitably splined or keyed spring closed check valve 87. The stem of the valve at the right is either cammed to open position by way of its contact with the surface of the trip pin 74 as shown in Fig. 3 or when it drops into the recess or clearance pocket 88 (Fig. 2) when the valve is closed. When the valve 68 controlling the supply from the reservoir is closed as shown in Fig. 3 the valve 87 is subject to being open. Inasmuch as accumulated pressurized gas has been trapped in the conduits 46, the by-pass 48 and the firing chamber the gas is "ready to fire." Therefore all that is necessary to fire the gun is to open the firing chamber control valve 87. This is accomplished by way of a trigger rod 90 which is slidable in a suitable passage 92 provided therefor in the stock. At the left hand end as seen in Fig. 3 this trigger rod is provided with a suitably knurled and upwardly shaped thumb piece 94. The median portion of the bar or rod is provided with a toothed rack 96 engaging a segmental gear or pinion 98 on the surface median portion of the aforementioned revolvable trip pin and valve 74. Therefore, so long as the valve or rather the port 82 in the valve 74 is closed and the passage made up of the components 84 and 85 is closed and the firing chamber control valve 87 is closed, nothing happens. When, however, one moves the thumb piece 94 and trigger 90 in a direction from left to right in Fig. 3, the rack and pinion means comes into play and rotates or revolves the trip pin and valve 74. This results in the firing chamber coming into play and forcibly delivering the energy or charge into the breech or pocket 86. As soon as the trigger 90 is released the automatically operating return spring 100 (Figs. 2 and 3) comes into play and the valving port 82 and valve 87 are returned to their normal relationship.

So far the invention has had to do primarily with the left hand end portion of the gun, that is the stock, the parts built into the stock and the handle, firing chamber and components. At this time attention is directed to the barrel 102 which extends beyond the front or distal end of the stock. The junctional portion of the barrel of the barrel of the stock is fashioned into the aforementioned breech pocket 86 to accommodate the insertable readyto-eject projectile 104. The lining in the bore of the barrel is provided with a keyway 106 and as seen in Fig. 12 the terminal or muzzle end of the barrel is provided with cooperating notches 108. These notches serve to releasably seat and retain the novel travelling sinker 110. The sinker seen in Fig. 14 has an elongated body portion 112 with an eye 114 at one end to which a portion 116 of the outer end portion 118 of the fishing line 120 is connected. The line spools off the reel portion 122 of a spinner type reel 124 which as shown in Fig. 1 in particular has a suitable T-shaped base or bracket 126 with one end supported in the socket 128 and the other end saddled in the stirrup or hanger 130. The line passes from left to right in Fig. 1 through a guide 128 on the fishing rod 130 and through additional eyes (not shown) and then finally through the tip or end eye 132 where it is connected with the aforementioned eye or ring 114 on the sinker. Therefore, in order to unwind the line and send it out to the fishing spot it is necessary for the sinker to be "shot" into space. It will be noticed in this connection that the body of the sinker has a head 134 at one end with grooves 136, with the grooves keyed in the notches 108. The grooved head is provided with a coupling stud or pin 138.

It is the duty of the powered forcibly ejected projectile to pick up the sinker 110 from its set ready-to-fly position and this is actually accomplished in the manner shown in section in Fig. 2 when the outgoing projectile actually becomes coupled with the sinker and two parts, the projectile and sinker, travel in unison through the air toward the fishing spot or target. With further reference to Fig. 12 there is a lead or suitably heavy body 140 provided and on the left hand end this is formed into a sort of a plug 142 which receives an end portion 144 of a sleeve. There is another plug 146 telescoping into the left hand end of the sleeve and this plug 146 has an L-shaped recess 148 provided therein and which recess serves to accommodate the L-shaped setting and starting hook 150 in the manner shown in Figs. 2 and 3. The sleeve and plugs fitting into the end provide an airtight hollow body which becomes a float. Therefore the left hand end portion of the projectile takes the form of a float and the right hand end portion a weight so that when the projectile hits the water the weighted end sinks and the buoyant end stands to provide a sort of a fishing spot indicating buoy, similar to a bobber. In other instances the sinker which is picked up by the outgoing projectile sometimes separates from the weighted float resulting in the weighted float taking off on its own voyage and of course functioning only to "spook" fish without being capable of being retrieved by the fisherman. When the sinker separates from the weighted float the fishing line which is attached thereto of course goes down into the water. With further reference to the breech pocket 86 attention is directed to the lid or cover 154 this being hingedly mounted at one end as shown at 156 in Fig. 1. The other free swingable end is provided with an extending tongue 158 which is engageable by a releasing hold-down latch or catch 160. Thus in order to insert the projectiles it is necessary to simply open the lid 154 and expose the pocket whereupon the projectile is fitted in and ready-for-use. In this connection the L-shaped recess 148 is fitted over the correspondingly shaped anchoring bracket 150 and this keeps the parts properly lined up to start with. The projectile however has a long keying rib 162 along the bottom which rides in a keyway 164 so that the projectile is guided in such a way that an off-center socket 166 in the weighted end comes into line with the pick-up coupling stud 138. As the stud 138 slips into the socket 146 the two parts, that is the weighted projectile and sinker become one unit and the gas pressure sends the tool out into space carrying the fishing line and baited hook therewith.

Returning now to the fishing rod or pole 130 it will be noticed that this is removably mounted in place by way of a threaded collar or chuck 161 cooperating with a friction gripping clamp 163 mounted on the distal end portion 22 of the stock 20. Also as seen in Fig. 2 the end portion of the rod denoted at 165 extends into a hollow space or pocket 167 by way of a bore 169 leading into the space or pocket. With this arrangement by simply loosening the chuck the fishing rod 130 can be detached and used for fishing independently of the firing gun. Thus, the gun constitutes a fishing rod and reel holder. Perhaps the expression "fishing device" comprehends the entire assemblage which would mean the gun with the handle and barrel and all of its components, the reel, and fishing rod.

Although it is of perhaps no necessary consequence it will be noticed that the leading end 141 (Fig. 12) of the weighted end portion 140 of the missile or projectile is provided with an extending and guiding nose which assists in the flight of the sinker carrying projectile through the air.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an elongated barrel having a muzzle at a forward end thereof, said forward end having means adapted to support an accessible, as well as readily applicable and removable line casting sinker which is adapted to carry the line in flight toward a selected fishing spot, a spinning reel supported in operative relation adjacent the inner end of said barrel, a fishing line wound on said reel and adapted to be spooled therefrom, said fishing line having a baited hook and being connected with said sinker so that the sinker serves to carry the line and hook out to the selected spot, said barrel being provided at its inner end with an openable and closable breech and cooperable missile chamber, a missile insertable through said breech and adapted to be forcibly ejected from the chamber through the bore of the barrel in a manner to positively engage and pick up the sinker, means affording a separable coupling between the missile and sinker, a stock to which the inner end of said barrel is connected, said stock having a firing chamber and means for delivering a pressurized charge of gas into the firing chamber and from the firing chamber to the breech, said last named means embodying a passageway between the firing chamber and adjacent intake end of the breech, a trip pin operating with said passageway, manually controllable spring retention trigger means slidingly mounted in the stock and operatively engageable with trip pin, said sinker being provided with a pick up and coupling pin, the leading end of said missile having a socket aligned with and into which said pin is adapted to telescope so that the socket and coupling pin serve to separably interconnect the sinker and missile.

2. The structure defined in claim 1 and wherein said barrel is provided interiorly with a longitudinal keyway, said missile having a lengthwise rib constituting a key and said key being slidably keyed in said keyway.

3. The structure defined in claim 2, wherein the inward end portion of said missile embodies a float, said float having an L-shaped recess therein, and there being an L-shaped anchoring hook normally situated in said breech with portions of the hook engageable with cooperating portions of the L-shaped recess to assist in lining up and initiating the start of operation of the missile until the pressurized energy comes into play and to direct the keyed course of movement for the inner end of the barrel to the outer end of the barrel.

4. A powered fishing device adapted to accurately cast a baited hook into an ordinarily inaccessible fishing area comprising a stock provided at an inner end with handle means, a barrel attached to and extending beyond the forward end of the stock, a breech chamber at the juncture of the barrel and stock, said breech chamber having an openable closure, said breech chamber being adapted to receive a ready-to-fire projectile, a projectible missile mounted in said breech chamber in alignment with the bore of the barrel, said missile having weight means at one end and buoyant float means at the opposite end and also having a lengthwise rib providing a key, said barrel having a keyway and said key being mounted for reciprocation in said keyway, the muzzle end of said barrel having keeper notches therein, a sinker having a headed portion removably engaged in the keeper notches and also provided with a coupling pin projecting in a direction toward the leading end of said missile, said leading end having a socket therein and said coupling pin being adapted to line up and land in said socket so that as the missile is shot from the chamber to follow the line it will pick up the sinker and carry it along into space, and powering means incorporated in said handle and stock and serving to act on the missile when energized, said handle being hollow and providing a reservoir for compressed gas cartridges, said stock having a firing chamber for pressurized gas, further having passages leading from the reservoir to said firing chamber, said passages including conduits, a spring closed valve and normally closing said conduits, a second valve normally closing the exit from the firing chamber, said stock having a passageway leading from the exit across the stock and into the intake end of said breech chamber, said stock being further provided with a bore providing a socket, and a revolving trip pin rotatably mounted in said socket, the surfaces of said trip pin having cams formed thereon, said valves having spring pressed stem portions engageable with their respective cams, the cams on the pin being further provided with recesses offering clearance pockets for the adjacent spring projected ends of the valve stems, and said pin being further provided with a port which serves to permit the pressurized gas to pass through the passageway from the firing chamber into the breech chamber.

5. The structure defined in claim 4, and wherein said firing chamber has an extended neck portion provided with a screw plug, said screw plug having a finger grip with a flange, said flange having an index, and said neck having graduations with which said index cooperates so that with the use of the plug and finger-grip the variable size of the firing chamber may be regulated to thus proportionately increase or decrease the intensity of the usable charge which is trapped in said firing chamber.

6. The structure defined in claim 5, and wherein the median portion of said trip pin is provided with a gear segment providing a pinion, a trigger, said trigger having a finger-piece at one end and a rod operable in a passage provided therefor in said stock, said rod having rack teeth providing a rack and the teeth of said rack cooperatively engaging the teeth of the pinion, and a return spring incorporated in said stock and engageable with an end portion of said trigger rod for purposes of returning the trigger rod to a normal inactive position.

References Cited in the file of this patent
UNITED STATES PATENTS

| | | |
|---|---|---|
| 883,197 | Hestness | Mar. 31, 1908 |
| 1,473,507 | Obermaier | Nov. 6, 1923 |
| 2,833,266 | Mares | May 6, 1958 |
| 2,839,862 | Hanshaw | June 24, 1958 |